United States Patent [19]
Dalrymple et al.

[11] Patent Number: 5,142,617
[45] Date of Patent: Aug. 25, 1992

[54] METHOD OF SHADING A GRAPHICS IMAGE

[75] Inventors: John C. Dalrymple, Portland; V. B. Sureshkumar, Lake Oswego, both of Oreg.

[73] Assignee: Tektronix, Inc., Wilsonville, Oreg.

[21] Appl. No.: 263,294

[22] Filed: Oct. 27, 1988

[51] Int. Cl.⁵ .......................................... G06F 15/626
[52] U.S. Cl. ................................. 395/132; 395/141; 340/728
[58] Field of Search ....................... 364/518, 521, 522; 340/728, 750; 395/141, 132, 129

[56] References Cited

U.S. PATENT DOCUMENTS

| | | | |
|---|---|---|---|
| 4,608,653 | 8/1986 | Setoguchi | 364/522 |
| 4,754,269 | 6/1988 | Kishi et al. | 340/729 |
| 4,775,946 | 10/1988 | Anjyo | 364/522 |
| 4,791,583 | 12/1988 | Colburn | 364/522 |
| 4,812,836 | 3/1989 | Kurakake et al. | 340/724 |

OTHER PUBLICATIONS

Newman et al. "Principles of Interactive Computer Graphics" McGraw Hill Book Company 1979 pp. 389–402.

Primary Examiner—Gary V. Harkcom
Assistant Examiner—Phu K. Nguyen
Attorney, Agent, or Firm—Francis I. Gray; John Smith-Hill

[57] ABSTRACT

A method and apparatus for tiling a display area defined by lines joining vertices with a surface normal vector associated with each vertex whereby the display area is subdivided into sub-display areas by calculating additional vertices and surface normal vectors by interpolation and rendering a given sub-display area by calculating intensity values at its vertices and tiling its area by linear interpolation of the calculated vertex intensity values.

10 Claims, 3 Drawing Sheets

METHOD OF SHADING A GRAPHICS IMAGE

BACKGROUND OF THE INVENTION

This invention relates to a method of shading a graphics image.

In a computer graphics system, an image is displayed on the screen of a cathode-ray-tube (CRT) or other display device. Generally, the electron beam of the CRT is deflected under control of a digital signal having an X (horizontal) component and a Y (vertical) component, so that pixels on a rectangular array of grid points are addressed row-by-row in accordance with a raster pattern. Data representing the image is generated in a picture processor and is down-loaded from the picture processor to a frame buffer. The frame buffer has memory locations which correspond on a one-to-one basis with the grid points of the CRT display. In the following description, it will be assumed for the sake of clarity that the memory locations of the frame buffer are physically arranged in a rectangular array which corresponds to the array of grid points of the display.

The digital signal used to control deflection of the CRT's electron beam is also used to control addressing of the frame buffer, and the color with which the pixel at a grid point is displayed depends on the contents of the corresponding memory location. The frame buffer thus contains a virtual image of the display that is provided by the CRT. The data provided to the frame buffer by the picture processor may represent an image composed of colored areas. The process of loading data values into the frame buffer memory to represent a colored area is called tiling. In the following description, references are made in connection with a tiling operation to the tiling of specified grid points and the tiling of triangles. However, this is intended merely as an abbreviated way of referring to the tiling of the memory locations corresponding to the specified grid points and to the tiling of the memory locations corresponding to the grid points that lie within the triangles.

A computer graphics system may be used to depict a three-dimensional curved surface by resolving the surface into triangular facets and displaying the projection of those facets into a two-dimensional display plane. Each triangular facet forms a triangle or a line segment when projected into the display plane. The case in which the projection is a line segment will not be considered further herein. Information defining the triangular facets in three-dimensional world space is specified to the picture processor, which utilizes that information to generate information defining the corresponding display plane triangles. This information is made available by the picture processor to a rendering engine, which is used to load shading intensity values I into the frame buffer. Generally, the triangular facets are treated sequentially by the picture processor.

In order to provide an accurate depiction, it is necessary to take account of the fact that when a three-dimensional object is examined, surfaces of the object that are on the far side of the object from the viewer cannot be seen, and therefore data representing these surfaces should not be loaded into the frame buffer. In a graphics system, this is accomplished by hidden surface removal. Hidden surface removal is discussed in Newman and Sproull, "Principles of Interactive Computer Graphics" (McGraw-Hill Book Company, 1979), Second Edition, 369.

Data loaded into the frame buffer memory for tiling of a given grid point represents the color and intensity of light reflected towards the viewer by the corresponding point of the surface being depicted. In the present discussion, this data is referred to as an intensity value I, but may actually be several values representing intensities of separate color components, e.g. intensities of red, green and blue. The three-dimensional appearance of a surface will generally be depicted with an enhanced degree of realism if the intensity value I for a grid point takes account of the position and orientation of the surface element that is depicted by that grid point. This may be accomplished by calculating a surface normal vector at the surface element and applying a lighting model to derive an intensity value I for a grid point representing that surface element. It should be appreciated that use of a lighting model to calculate a grid point intensity value is computationally expensive as complex calculations are required to account for light sources and surface reflectivity.

The intensity value I that is loaded into the frame buffer for a given grid point depends on a shading model that is applied to the displayed surface. Three major shading models are described in J. D. Foley and A. Van Dam, "Fundamentals of Interactive Computer Graphics", 580-584, (1984). The three models are referred to as constant shading, intensity interpolation, or Gouraud, shading and normal-vector interpolation, or Phong, shading. Constant shading uses a single intensity value for a given display area and is much less satisfactory for depicting a curved surface than either Gouraud shading or Phong shading.

In Gouraud shading of a display plane triangle that represents a triangular facet, a vertex surface normal is given for each vertex of the facet, and a vertex intensity is found for each corresponding display plane vertex by applying a selected lighting model to the corresponding vertex normal. The calculated intensity values provide a basis for shading the display plane triangle by linear interpolation of these intensities along each edge of the triangle and between edges along each scan line. Thus, to Gouraud shade a triangle the selected lighting model is accessed once for each vertex. In Phong shading of a triangle, the vertex surface normals are given. End point normals are calculated for the points of intersection of each scan line with the edges of the triangle, by interpolation between the vertex normals at opposite ends of the edges that are intersected by the scan line. For each pixel along a scan line, a surface normal vector is calculated by interpolation between the end point vectors for that scan line. A surface normal vector is associated with every pixel and a selected lighting model is applied to the surface normal vector for each and every pixel to calculate its shading intensity. Because the lighting model is computed for every grid point within the triangle, Phong shading generally requires much more time to execute than Gouraud shading. However, Phong shading provides a more realistic depiction of an object because the position and orientation of each surface element corresponding to each grid point is taken into account.

SUMMARY OF THE INVENTION

A preferred embodiment of the present invention is a method of loading a memory device having a plurality of addressable memory locations, each of which can be defined uniquely by an address having an X component and a Y component, which locations correspond respectively to grid points in a rectangular array, and wherein it is desired to load or tile memory locations lying within a display area defined by at least three vertices (X0,Y0), (X1, Y1) and (X2,Y2), and their associated surface normal vectors. The method comprises defining points (X3,Y3) and (X4,Y4) on the lines that join the point (X0,Y0) with the points (X1,Y1) and (X2,Y2) respectively, such that a sub-area is defined by the points (X0,Y0), (X3,Y3) and (X4,Y4). Surface normal vectors for points (X3,Y3) and (X4,Y4) are derived by interpolation of the surface normal vectors associated with points (X0,Y0), (X1,Y1) and (X2,Y2). Intensity values I0, I3 and I4 for the points (X0,Y0), (X3,Y3) and (X4,Y4) are calculated by application of a lighting model to their associated surface normal vectors, and memory locations corresponding to points within the subarea are loaded with intensity values that are derived from I0, I3 and I4.

In one aspect of the preferred embodiment, a "parent" triangle presented for tiling models a portion of a curved surface, the parent triangle being defined by three vertices and three corresponding surface normal vectors each taken as being normal to the curved surface. Congruent sub-triangles are defined by bisecting each side of the parent triangle and surface normal vectors are derived for each vertex of each sub-triangle by interpolation of the surface normal vectors of the parent triangle. Each sub-triangle is tested to determine suitability for Gouraud shading. Sub-triangles not considered suitable for Gouraud shading are further subdivided and the new sub-triangles are tested to determine suitability for Gouraud shading. Sub-triangles considered suitable for Gouraud shading are tiled by first applying the vertex surface normal vectors to a lighting model to obtain vertex intensity values and interpolating these intensity values across the interior of the sub-triangle.

DESCRIPTION OF DRAWINGS

For a better understanding of the invention, and to show how the same may be carried into effect, reference will now be made, by way of example, to the accompanying drawings in which.

DETAILED DESCRIPTION

Figure 1:
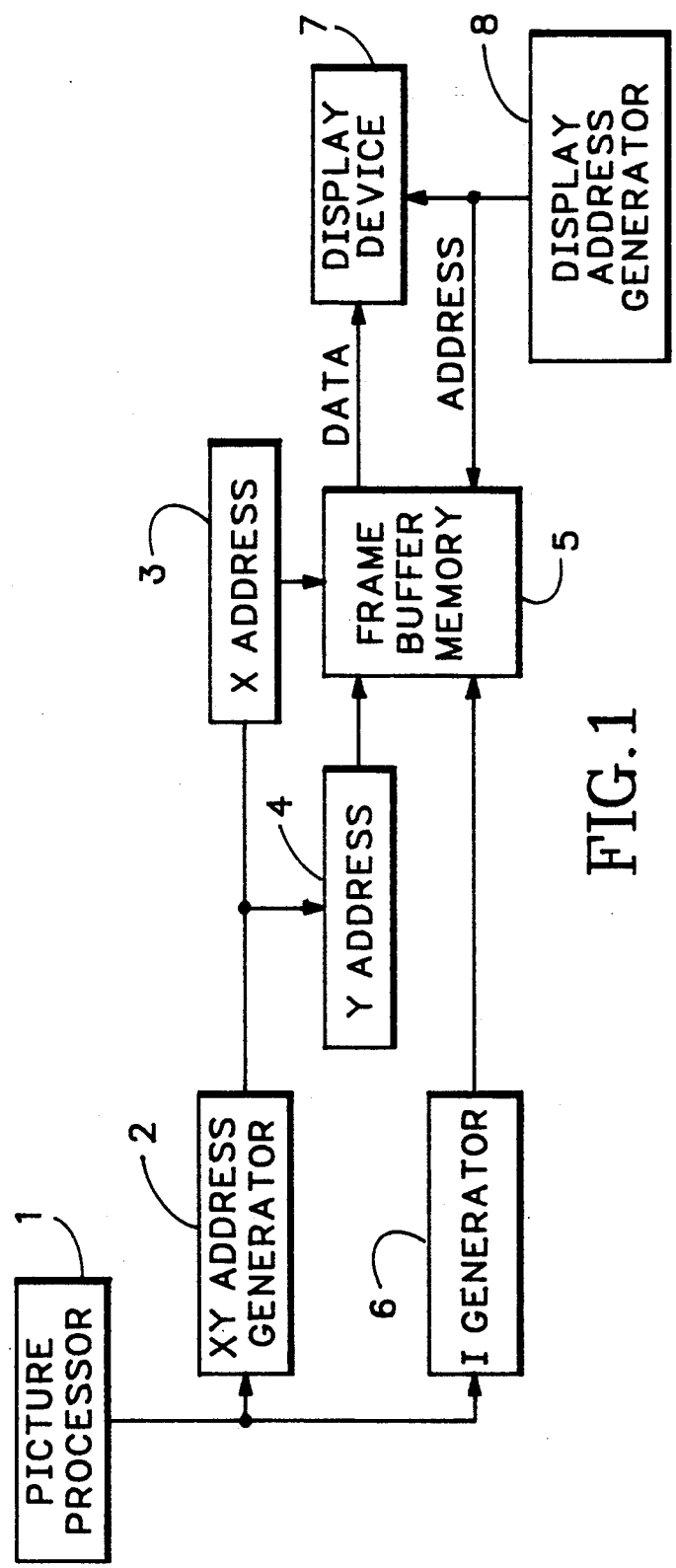
FIG. 1 is a block diagram of a computer graphics system.

The computer graphics system illustrated in FIG. 1 comprises a picture processor 1 which receives a display list and generates information representing triangles and applies information defining these triangles sequentially to an XY address generator 2 and an I generator 6. XY address generator 2 is described and claimed in copending U.S. patent application Ser. No. 07/113,031 filed Oct. 26, 1987, and in U.S. patent application Ser. No. 07/113,045, filed Oct. 26, 1987, the disclosures of which are hereby incorporated by reference herein. I generator 6 is described in co-pending U.S. patent application Ser. No. 07/113,045. XY address generator 2 executes a modified Bresenham algorithm to select grid points within a display plane triangle by providing an X address in register 3 and a Y address in register 4 for addressing a frame buffer memory 5. I generator 6 performs Gouraud shading by applying an intensity value to frame buffer memory 5 for each of the selected grid points.

The computer graphics system further comprises a display device 7 and a display address generator 8. The display address generator generates a display address signal having an X (horizontal) component and a Y (vertical) component such that pixels on a rectangular array of grid points of the display device are addressed row by row in accordance with a raster pattern. When the memory 5 has been loaded with intensity values provided by I generator 6, the display address generator reads the contents of the memory and employs the contents of the memory to pixellate the display device.

Figure 2:
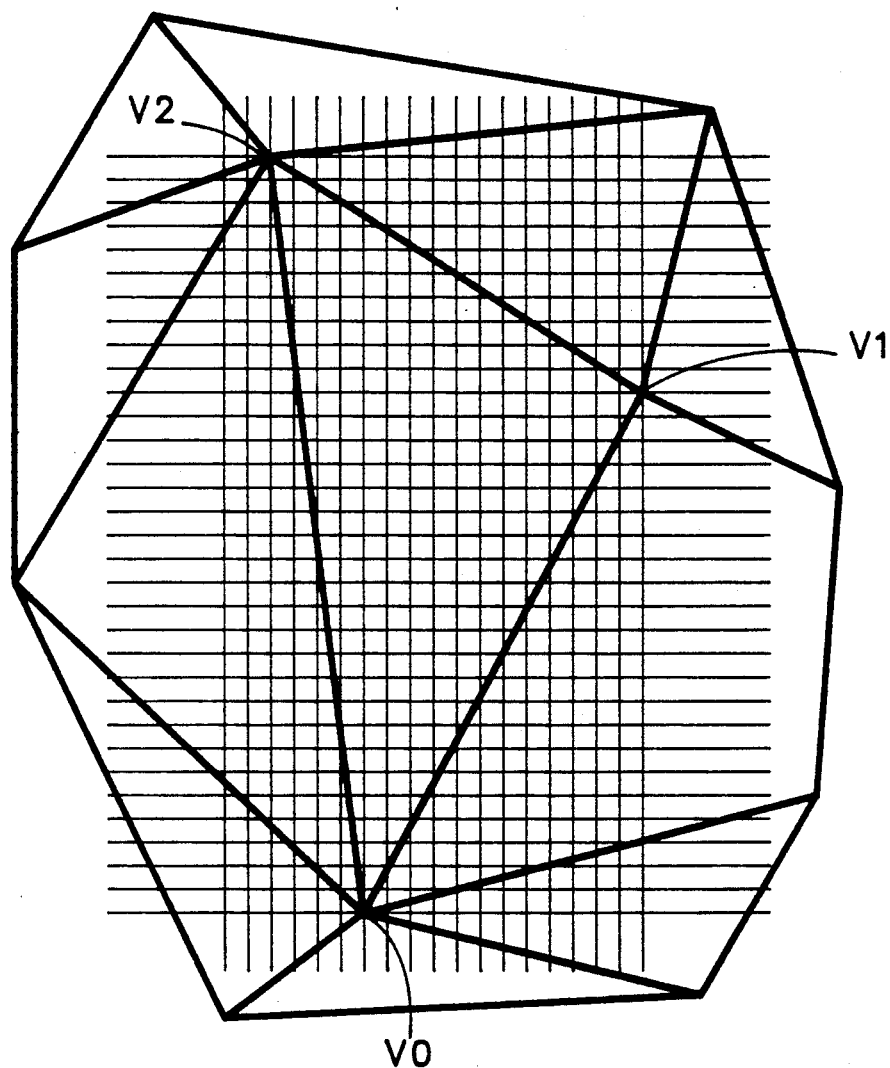
FIG. 2 illustrates a rectangular array of grid points and a triangle having its vertices at grid points.

FIG. 2 illustrates a mesh of display plane triangles, including a triangle having vertices V0, V1 and V2. FIG. 2 also illustrates lines representing ordinate values Y and abscissa values X for the grid points. The triangle V0V1V2 is a projection into the display plane of a triangular facet modeling a portion of a curved surface which has been resolved into multiple triangular facets in order to facilitate its depiction by the computer graphics system.

The display list received by picture processor 1 includes world coordinates (X,Y,Z) of the vertices of each triangular facet and a surface normal vector, having (X, Y, Z) components, corresponding to each vertex, the surface normal vectors being taken as normal to the curved surface modeled by the facet in the vicinity of the corresponding vertex. Processor 1 calculates an intensity value I for a vertex by applying an appropriate lighting model to the corresponding surface normal vector.

In order to place the invention in context, Gouraud shading of a triangle, defined by coordinate values of the three vertices and their corresponding surface normal vectors, will first be discussed. Values of I, viz. I0, I1, and I2, are calculated for each vertex by applying an appropriate lighting model to the respective vertex normals. In order to tile a triangle, XY address generator 2 and I generator 6 are first placed in an initialization state wherein registers of generator 2 are loaded with data defining an area for tiling and registers of generator 6 are loaded with initial and incremental intensity values. Generators 2 and 6 are then placed in an operating state in which operation is under control of a state machine which steps sequentially through predetermined states in successive clock cycles defined by a master clock.

Gouraud shading is performed on a row-by-row basis from below upwards. Accordingly, picture processor 1 sorts the vertices of the triangle by increasing value of Y. In the case of the facet shown in FIG. 2, Y0<Y1<Y2, and therefore the facet is tiled from the row containing vertex V0 to the row containing vertex V2. A row may be tiled either from left to right or from right to left.

A triangle is considered to have two "sidings" extending between its minimum ordinate value and its maximum ordinate value. The triangle V0V1V2 has sidings V0V2 and V0V1V2. One of the sidings is selected as the "major" siding while the other is considered the "minor" siding, and tiling of each grid row proceeds from the major siding to the opposite minor siding. Generally, the major siding is selected to be the siding that is composed of fewer edges. Whether the major siding is on the left or right is determined by evaluating the cross product of the two edges that extend from vertex V0. In the case of FIG. 2, therefore, the siding V0V2 is selected as the major siding and tiling is performed from left to right.

To execute the modified Bresenham algorithm a set of Bresenham parameters is required for each edge of the triangle. These parameters include DX (change in X), DY (change in Y), s (line slope expressed as an integer and calculated as floor (DX/DY)), PInc (positive increment calculated as DX−sDY−DY), NInc (negative increment calculated as DX−sDY), AErr (initial error), $X_0$ (X coordinate of seed grid point) and $Y_0$ (Y coordinate of seed grid point). To tile a series of grid lines connecting two edges of the triangle, Bresenham parameters for these edges must be loaded into XY address generator 2.

The picture processor 1 establishes a vertex data structure for each vertex of the triangle. Each vertex data structure comprises coordinate values in X, Y and Z for the vertex position and the vertex surface normal vector component values in X, Y and Z. Intensity values by color component, e.g. intensities of red, green and blue, may be stored in each vertex data structure. The data structures may also contain device or pixel coordinate values for each vertex as provided by a selected transformation function. Each vertex data structure stores a set of Bresenham parameters corresponding to one edge of the triangle. The vertex data structure corresponding to V0 stores Bresenham parameters for edge V0V1, the structure corresponding to vertex V1 stores parameters for edge V1V2, and the structure associated with vertex V2 stores parameters for edge V2V0.

It will be appreciated that information contained in the vertex data structures enables processor 1 to initiate XY address generator 2 and I generator 6 for executing the modified Bresenham algorithm in conjunction with Gouraud shading techniques to tile a display area. More particularly, two edges of the triangle, one forming the major siding and the other forming a portion of the minor siding, are considered "active" as each scan line or grid row is tiled and information in the vertex data structures is used for initializing XY address generator 2 and I generator 6 prior to tiling a series of scan lines intersecting both active edges. Thus, the vertex data structures are consulted during initialization of XY address generator 2 to load the following values in registers of XY generator 2: AErrM, AErrm, PIncM, PIncm, NIncM, NIncm, DYM, DYm, sM, sm, XM, Xm, and a logical value indicating the direction of tiling as either right to left or left to right. Bresenham-parameter names ending in "M" are associated with the major siding and those ending in "m" are associated with the minor siding.

The I generator 6 generates an intensity value I for each pair of coordinates (X,Y) provided by XY address generator 2. In Gouraud shading, it is assumed that the value of I varies linearly in both the vertical direction and the horizontal direction. Therefore, the intensity values I0, I1 and I2 for the vertices V0, V1 and V2 satisfy a plane equation in X and Y from which a horizontal intensity increment and vertical intensity increment may be calculated. Initially, picture processor 1 loads the horizontal and vertical intensity increment values in I generator 6 and calculates an initial intensity value I for determining the intensity of the first grid point to be tiled, and this value is also loaded into I generator 6.

After initialization, XY address generator 2 and I generator 6 enter the operating state. In this state generators 2 and 6 operate synchronously to tile the triangle according to the modified Bresenham algorithm and the Gouraud shading model. XY address generator 2 calculates the X coordinate for the first pixel to be tiled on each row and the number Hrz of pixels to be tiled on that row, and also determines the direction (left to right or right to left) in which tiling is to take place. I generator 6 provides an I value for each grid point addressed by generator 2. It will be noted from the co-pending U.S. patent application Ser. No. 07/113,031 that no value of Hrz is calculated at the bottom grid row of the triangle and therefore the bottom grid row is not tiled. However, the top row is tiled. Similarly, the grid point at the floor of the exact intersection of a grid row with the right siding (V0V1V2 in the case of FIG. 2) and the grid point at one plus the floor of the exact intersection of the grid row with the left siding and all the grid points lying between the above two grid points on the given grid row are tiled. Accordingly, when triangles abut, e.g. in a tessellation, a grid point at the boundary between two adjacent triangles is treated as being in one, and only one, triangle. This ensures that there are no gaps between triangles and no overlaps of triangles.

Gouraud shading the triangle V0V1V2 in this manner would be satisfactory if the portion of the curved surface represented by the triangle were substantially planar. However, this is not generally a valid assumption, and therefore Gouraud shading in this manner would not normally be satisfactory in relation to that obtained by Phong shading. On the other hand, Phong shading is computationally expensive and often not necessary for a reasonably accurate rendition of a curved surface.

Figure 3:
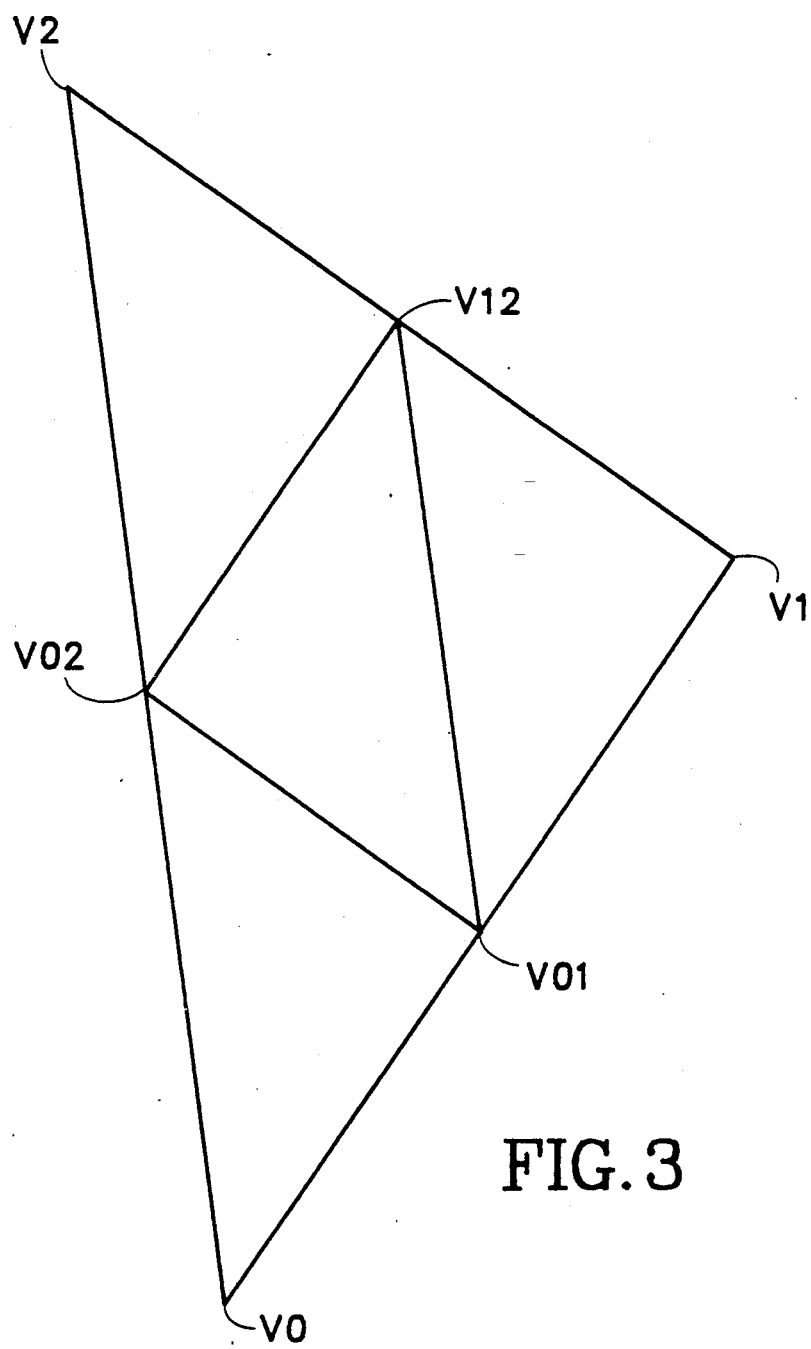
FIG. 3 illustrates the triangle of FIG. 2, divided into sub-triangles.

In order to avoid this limitation on the usefulness of Gouraud shading and avoid the computational costs associated with Phong shading, a combination of Phong and Gouraud shading techniques is used. The display plane triangle is divided into four congruent sub-triangles (FIG. 3) by bisecting each edge of the triangle and connecting the bisection points to form four sub-triangles. For each sub-triangle three vertex data structures are established with each structure containing the same parameters as the vertex data structures for vertices of the parent triangle. The positional coordinate values and surface normal vector components for the new vertices are obtained by interpolation. For example, the bisection points of the edges V0V1, V1V2 and V0V2, which may be designated V01, V12 and V02, respectively have coordinate values interpolated from the coordinate values for points V0, V1 and V2, and have surface normal vector components interpolated from the surface normal vector components for points V0, V1 and V2. A sub-triangle may be further subdivided in like manner if not considered suitable for Gouraud shading, otherwise it is Gouraud shaded. Hence, surface normal vector interpolation, a Phong shading technique, is used to a limited extent, but when a sub-triangle is suitable for Gouraud shading intensity values are calculated at each vertex and the sub-triangle is tiled by linear interpolation of intensity values, i.e. a Gouraud shading technique.

Triangle subdivision may be performed in world space or pixel space. When performed in world space the step of Gouraud shading must include a transformation function to pixel coordinates. When performed in pixel space the triangle vertices are converted to pixel coordinates prior to subdivision and the step of Gouraud shading is executed as previously described. In the following discussion it will be assumed that subdivision is performed in pixel space.

Because sub-triangles are formed by bisection, each edge of a sub-triangle is parallel to a corresponding edge of its parent triangle. Accordingly, the values of DX/DY, s, PInc and NInc for each edge of a sub-triangle are the same as the values of DX/DY, s, PInc and NInc for a corresponding parallel edge of its parent triangle. Because values for these parameters are taken directly from the parent triangle, vertices of sub-triangles need not be converted to pixel coordinates to calculate Bresenham parameters and rounding errors associated with such conversions can be avoided.

The sub-division algorithm is particularly useful as a recursive procedure whereby a parent triangle is the initial input parameter and its sub-triangles are passed in subsequent recursive calls with recursion being dependent upon a given sub-triangle's suitability for Gouraud shading. Thus, a parent triangle may be recursively subdivided into many smaller sub-triangles each corresponding to a smaller, more planar portion of the curved surface, and as such more suitable for Gouraud shading than its parent. Eventually, each sub-triangle is considered suitable for Gouraud shading and the vertex data structures for its vertices must be completed by calculating an AErr value (initial error value) and a seed grid point $(X_0, Y_0)$ for each sub-triangle edge to execute Gouraud shading. The seed grid point $(X_0, Y_0)$ indicates where tiling is to begin with respect to the associated edge and AErr indicates the distance in the X direction from $(X_0, Y_0)$ to the associated edge.

To illustrate recursive subdivision of a parent triangle, consider triangle V0V1V2 as a parent triangle presented for tiling with each vertex of triangle V0V1V2 defined in terms of positional coordinates and surface normal vectors. In the following discussion positional coordinate values are designated with prefixes x, y and z while surface normal vector components are designated with prefixes a, b and c. Hence, the vertices of a parent triangle are associated with the following positional and surface normal vector parameters:

V0 with (x0, y0, z0) and (a0, b0, c0)
V1 with (x1, y1, z1) and (a1, b1, c1)
V2 with (x2, y2, z2) and (a2, b2, c2)

Prior to invoking the recursive procedure the vertices V0, V1, and V2 of the parent triangle are transformed to device (pixel) coordinates and the transformed vertices are sorted in ascending order according to the Y component. In the present example V0 has the smallest Y component and V2 has the largest. The Bresenham incremental parameters for each edge of the parent triangle are computed, using the device coordinates of each vertex, and stored in the appropriate vertex data structure.

For edge V1V0:

DY10 = y1 − y0
DX10 = x1 − x0
slope10 = DX10/DY10
s10 = floor(slope10)
PInc10 = DX10 − s10*DY10 − DY10
NInc10 = DX10 − s10*DY10

For edge V2V1:

DY21 = y2 − y1
DX21 = x2 − x1
slope21 = DX21/DY21
s21 = floor(slope21)
PInc21 = DX21 − s21*DY21 − DY21
NInc21 = DX21 − s21*DY21

For edge V2V0:

DY20 = y2 − y0
slope20 = DX20/DY20
s20 = floor(slope20)
PInc20 = DX20 − s20*DY20 − DY20
NInc20 = DX20 − s20*DY20

These Bresenham parameters are applicable to any sub-triangle of the parent, and the vertices of each sub-triangle are automatically sorted according to the Y component since the sub-triangles are similar to the parent triangle and the parent triangle is already sorted according to the Y component.

The next step is to determine whether the parent triangle is suitable for Gouraud shading. As will be discussed in greater detail hereafter, several methods may be used to determine suitability for Gouraud shading.

If the parent triangle is considered suitable for Gouraud shading, then the shading procedure discussed is employed to shade the parent triangle. Otherwise, the vertex data structures of the parent triangle are passed to the following recursive procedure entitled PSEUDO PHONG. Local variables V01, V02, and V12 are vertex data structures corresponding to the bisection points of edges V0V1, V0V2 and V1V2, respectively.

```
PSEUDO_PHONG (V0, V1, V2)
vertex V01, V02, V12
        begin pseudo_phong
        /* get bisection point V02 for edge V0V2 */
                V02.x := (V0.x + V2.x)/2
                V02.y := (V0.y + V2.y)/2
                V02.z := (V0.y + V2.y)/2
        /* get surface normal vector for bisection
        point V02 */
                V02.a := (V0.a + V2.a)
                V02.b := (V0.b + V2.b)
                V02.c := (V0.c + V2.c)
                L := NORM(V02.a, V02.b, V02.c)
                V02.a := V02.a/L
                V02.b := V02.b/L
                V02.c := V02.c/L
        /* get bisection point V01 for edge V0V1 */
                V01.x := (V0.x + V1.x)/2
                V01.y := (V0.y + V1.y)/2
                V01.z := (V0.y + V1.y)/2
        /* get surface normal vector for bisection
        point V01 */
                V01.a := (V0.a + V1.a)
                V01.b := (V0.b + V1.b)
                V01.c := (V0.c + V1.c)
                L := NORM(V01.a, V01.b, V01.c)
                V01.a := V01.a/L
                V01.b := V01.b/L
                V01.c := V01.c/L
        /* get bisection point V12 for edge V1V2 */
                V12.x := (V1.x + V2.x)/2
                V12.y := (V1.y + V2.y)/2
                V12.z := (V1.y + V2.y)/2
        /* get surface normal vector for bisection
        point V12 */
                V12.a := (V1.a + V2.a)
                V12.b := (V1.b + V2.b)
                V12.c := (V1.c + V2.c)
                L := NORM(V12.a, V12.b, V12.c)
                V12.a := V12.a/L
                V12.b := V12.b/L
                V12.c := V12.c/L
        /* test each sub-triangle to determine if suitable
        for Gouraud shading or if further subdivision
        is required */
        /* for triangle V01V12V02 */
```

```
                if (RECURSE_CONDITION(V01,V12,V02))
                    then PSEUDO_PHONG(V01,V12,V02)
                    else GOURAUD_SHADE(V01,V12,V02)
                /* for triangle V0V01V02 */
                if (RECURSE_CONDITION(V0,V01,V02))
                    then PSEUDO_PHONG(V0,V01,V02)
                    else GOURAUD_SHADE(V0,V01,V02)
                /* for triangle V01V1V12 */
                if (RECURSE_CONDITION(V01,V1,V12))
                    then PSEUDO_PHONG(V01,V1,V12)
                    else GOURAUD_SHADE(V01,V1,V12)
                /* for triangle V02V12V2 */
                if (RECURSE_CONDITION(V02,V12,V2))
                    then PSEUDO_PHONG(V02,V12,V2)
                    else GOURAUD_SHADE(V02,V12,V2)
         end pseudo_phong
```

The depth of recursion, as determined by the boolean function RECURSE_CONDITION, may be established in an adaptive manner by examining the approximate curvature of the surface in the vicinity of the facet. At each level of recursion, including the zeroth, a unit-length surface normal vector is given or calculated for each vertex of the triangle or sub-triangle. This is because unit-length normal vectors are needed for the lighting model computations. The three vertex surface normals of a triangle (or sub-triangle) are compared, by calculating their dot products and determining how close they are to unity. (The dot product of two unit vectors is equal to the cosine of the angle between the vectors. If each of the three dot products exceeds a predetermined value, which depends on the degree of realism desired, it is assumed that the surface is planar in the vicinity of the triangle (or sub-triangle). Alternatively, the cross product of two vectors may be calculated and its magnitude compared to zero. When the magnitude of the cross product is sufficiently close to zero, the triangle or sub-triangle may be considered suitably planar and Gouraud shading of the triangle (or sub-triangle) will provide a satisfactory rendering for a diffuse lighting model using point sources at infinity.

In addition, recursion may be a function of the size of the sub-triangle in device coordinates. Since, at a given level of recursion, all sub-triangles are congruent, they are all of the same size and therefore use of a size limitation on recursion results in each sub-triangle being divided the same number of times. However, adjacent display plane or parent triangles may be of different sizes, and therefore may not be divided the same number of times. When subdivision is performed in world space, this method introduces the possibility of gaps and overlaps between parent triangles as new vertices are introduced which should border adjacent triangles, but do not. In one embodiment of the invention, the depth of recursion is fixed at four recursive calls for each display plane triangle, thereby dividing each display plane triangle into 256 sub-triangles, and this has been found to provide satisfactory results.

A limitation on the depth of recursion is imposed by the number of parameters that can be stored. Thus, on each subdivision additional parameters are generated and must be stored for the next subdivision, and if the total number of parameters that can be stored is limited, the number of subdivisions that can be performed is also limited.

The function NORM returns the length or magnitude of a vector and may be implemented in several ways. A very accurate, but computationally expensive, version of NORM is as follows.

$$NORM\ (a,b,c) = square\_root(a*a + b*b + c*c)$$

A faster, but slightly less accurate version is listed as $$NORM\ (a,b,c) = MAX\ (ABS(a), ABS(b), ABS(c))$$

where the function ABS returns the absolute value of its argument. Given the length L of a vector, a unit surface normal vector is obtained from the interpolated surface normal vector by dividing each component by L.

If triangle subdivision is performed in world space then the procedure GOURAUD_SHADE is responsible for transforming triangle vertices into pixel coordinates. If subdivision is performed in pixel space, the procedure GOURAUD_SHADE operates according to the previous description of Gouraud shading.

Once a triangle or sub-triangle is determined to be suitable for Gouraud shading, the vertex data structures for its three vertices must be completed by calculating an AErr value and a seed grid point $(X_0,Y_0)$ for each edge. Because vertices of a sub-triangle are not necessarily coincident with grid points, calculation of these parameters is slightly different than the case of a parent triangle having its vertices at grid points. The Bresenham algorithm operates by incremental calculation of variables to determine the position of a given grid point with respect to a line. In tiling a particular sub-triangle, it is necessary to determine values for AErr, $X_0$, and $Y_0$ as if the Bresenham algorithm were tiling the parent triangle and had just reached the particular sub-triangle. The Bresenham algorithm could be executed in simulation as if tiling the parent triangle in order to capture these values at the moment of reaching the region of the sub-triangle. However, the following calculation performs this task more efficiently. Consider edge V01V12 of triangle V01V12V02. From the vertex data structures for the parent triangle, values for PInc, NInc, and s for edge V01V12 are known from the values for edge V0V2. Hence, slope = DX20/DY20
s = floor(slope)

To calculate AErr and a seed grid point $(X_0,Y_0)$ for edge V01V12 to tile sub-triangle V01V12V02:

$Y_0$ = floor(V01·y)
$X_0$real = V01·x − slope*(V01·y − Y0)
$X_0$floor($X_0$real)
AErr = floor((($X_0$real + slope) − ($X_0$+s) − 1)*DY20)

If edge V01V02 is on the left, the starting X value for this edge is $X_0+1$, otherwise it is $X_0$.

All necessary Bresenham parameters for edge V01V12 are now available: s, PInc, and NInc from the parent triangle and AErr, $X_0$, and $Y_0$ as computed above. Similar calculations are performed to complete the Bresenham parameters for edges V12V02 and V02V01. Calculation of intensity values for vertices V01, V12, and V02 are derived by application of a selected lighting model to the respective vertex surface normal vectors and sub-triangle V01V12V02 is Gouraud shaded using XY address generator 2 and I generator 6 as described above.

Thus a method of shading a display area has been shown which is less computationally expensive, yet nearly as good visually, compared to Phong shading. When used in conjunction with a Bresenham algorithm to shade sub-triangles formed by edge bisection, Bresenham incremental parameters calculated for the triangular area are applicable to its sub-triangles.

It will be appreciated that the present invention is not restricted to the particular method that has been described, and that variations may be made therein without departing from the scope of the invention as defined in the appended claims and equivalents thereof. For example, it is not necessary that Gouraud shading be performed on a sub-triangle, since constant shading may be performed if a lower degree of realism is acceptable. In the case in which dot products are calculated in order to determine whether to make a further recursion, it is not necessary that all three dot products of the unit vertex normals for a triangle (or sub-triangle) be evaluated, since if two of the dot products are almost one, the third dot product will not be much smaller than one.

The method of the present invention has application beyond triangle subdivision by edge bisection to obtain four congruent sub-triangles. Other methods may be used to generate sub-triangles. For example, parent triangles may be subdivided by determining the bisection point of one edge and connecting that point to the opposite vertex to divide a parent triangle into two sub-triangles, the positional coordinate values and surface normal vector component values being interpolated from the endpoints of the bisected edge.

We claim:

1. A method of shading a representation of a triangular surface having normal vectors associated with each vertex of the triangular surface, comprising:
   (a) defining three points each being on one of the three edges of the triangular surface, such that first, second, third and fourth sub-triangles are formed, each of the first, second and third sub-triangles having one of its three vertices in common with a corresponding vertex of the triangular surface and two of said three points as its other two vertices, and the fourth sub-triangle having said three points as its vertices respectively,
   (b) deriving interpolated normal vectors for said three points respectively from the normal vectors associated with the vertices of the triangular surface, and
   (c) if the interpolated normal vectors for the three vertices of a sub-triangle bear a predetermined relationship to each other, calculating intensity values for those three vertices respectively and utilizing the calculated intensity values to shade the sub-triangle.

2. A method of shading a representation of a curved surface modeled by a facet defined by three vertices, three straight lines joining those vertices, and normals to the curved surface associated with each vertex, comprising:
   (a) if the normals bear a predetermined relationship to each other, calculating intensity values for the three vertices respectively and utilizing the calculated intensity values to shade the facet,
   (b) otherwise:
      (i) calculating three points that bisect the three straight lines respectively, whereby four congruent sub-triangles are defined,
      (ii) deriving interpolated normals for said three points respectively from the normals associated with each vertex defining the facet, and
      (iii) if the interpolated normals for the three vertices of a sub-triangle bear a predetermined relationship to each other, calculating intensity values for these three vertices respectively and utilizing the calculated intensity values to shade the sub-triangle.

3. A method according to claim 2, wherein the method is recursive by application of the method of claim 2 to shade a sub-triangle when the interpolated normals of the sub-triangle do not bear said predetermined relationship.

4. A computer graphics system comprising:
   (a) a display device having a display surface defined by a set of grid points in a rectangular array,
   (b) display address means for generating a display address signal having an X component and a Y component for each grid point of the set of grid points,
   (c) picture processor means for receiving a display list containing the locations of at least three vertices (X0,Y0), (X1,Y1) and (X2,Y2) and normal vectors N0, N1 and N2 for the three vertices (X0,Y0), (X1,Y1) and (X2Y2) respectively, the picture processor means automatically generating intensity values corresponding to grid points lying within an area defined by the three vertices by performing the following operations,
      (i) defining points (X3,Y3) and (X4,Y4) on lines that join the point (X0,Y0) with the points (X1,Y1) and (X2,Y2) respectively, such that a sub-triangle is defined by the points (X0,Y0), (X3Y3) and (X4,Y4),
      (ii) deriving normal vectors N3 N4 for the points (X3,Y3) and (X4,Y4) from the normal vectors N0,N1 and N2,
      (iii) determining whether the normal vectors N0, N3 and N4 bear a predetermined relationship to each other, if so,
      (iv) calculating intensity values I0, I3 and I4 for the points (X0,Y0), (X3,Y3) and (X4,Y4) respectively, and
      (v) calculating intensity values for grid points within the sub-triangle from at least one of I0, I3 and I4,
   (d) an electronic memory device having a set of addressable memory locations corresponding to the set of grid points, and
   (e) means for loading the intensity values into the corresponding memory locations of the memory device.

5. A computer graphics system according to claim 4, wherein the means for loading intensity values into the memory device comprises an XY address generator connected to the picture processor means for automatically generating the addresses of the memory locations corresponding to grid points within the sub-triangle and applying the addresses to the memory device.

6. A computer graphics system according to claim 4, wherein the picture processor means comprises a picture processor for receiving the display list and an I generator connected to the picture processor for generating the intensity values.

7. A computer graphics system according to claim 4, wherein the picture processor means determines whether the normal vectors N0, N3 and N4 bear said predetermined relationship to each other by evaluating at least two dot products of the normal vectors N0, N3 and N4.

8. A computer graphics system according to claim 4, wherein the picture processor means determines whether the normal vectors N0, N3 and N4 bear said predetermined relationship to each other by evaluating at least two cross products of the normal vectors N0, N3 and N4.

9. A computer graphics system comprising:
(a) a display device having a display surface defined by a set of grid points in a rectangular array,
(b) display address means for generating a display address signal having an X component and a Y component for each grid point of the set of grid points,
(c) picture processor means for receiving a display list containing the locations of at least three vertices defining a triangular surface and three normal vectors associated with the vertices respectively, the picture processor means shading a representation of the triangular surface by performing the following operations,
  (i) defining three points each being on one of the three edges of the triangular surface, such that three sub-triangles are formed, each having one of its vertices in common with a corresponding vertex of the triangular surface and two of said three points as its other two vertices, and a fourth sub-triangle is formed with said three points as its vertices respectively,
  (ii) deriving interpolated normal vectors for said three points respectively from the normal vectors associated with the vertices of the triangular surface, and
  (iii) if the interpolated normal vectors for the three vertices of a sub-triangle bear a predetermined relationship to each other, calculating intensity values for those three vertices respectively,
(d) an electronic memory device having a set of addressable memory locations corresponding to the set of grid points, and
(e) means for loading the intensity values into the corresponding memory locations of the memory device to represent shading of the sub-triangle.

10. A computer graphics system comprising:
(a) a display device having a display surface defined by a set of grid points in a rectangular array,
(b) display address means for generating a display address signal having an X component and a Y component for each grid point of the set of grid points,
(c) picture processor means for receiving a display list containing the locations of at least three vertices (X0,Y0), (X1,Y1) and (X2,Y2) defining a display area, and surface normal vectors N0, N1 and N2 associated with the vertices (X0,Y0), (X1,Y1) and (X2,Y2), the picture processor means automatically generating intensity values corresponding to grid points lying within the display area by performing the following operations,
  (i) defining a vertex (X3,Y3) by reference to at least two of vertices (X0,Y0), (X1,Y1) and (X2Y2),
  (ii) defining a surface normal vector N3 corresponding to vertex (X3,Y3) by interpolation of at least two of vectors N0, N1 and N2,
  (iii) defining a sub-area within said display area defined by at least three of vertices (X0,Y0), (X1Y1), (X2,Y2) and (X3,Y3),
  (iv) calculating intensity values for said vertices defining said sub-area using the surface normal vectors corresponding to said vertices defining said sub-area, and
  (v) calculating intensity values for grid points within said sub-area from the intensity values for said vertices,
(d) an electronic memory device having a set of addressable memory locations corresponding to the set of grid points, and
(e) means for loading the intensity values into the corresponding memory locations of the memory device to represent shading of the sub-area.

* * * * *

UNITED STATES PATENT AND TRADEMARK OFFICE
CERTIFICATE OF CORRECTION

PATENT NO. : 5,142,617

DATED : August 25, 1992

INVENTOR(S) : John C. Dalrymple and V.B. Sureshkumar

It is certified that error appears in the above-identified patent and that said Letters Patent is hereby corrected as shown below:

Column 10,

| | | |
|---|---|---|
| Claim 4, | Line 19 | Insert comma "," between "X2" and "Y2" |
| Claim 4, | Line 29 | Insert " and " between "N3" and "N4" |

Column 12,

| | | |
|---|---|---|
| Claim 10, | Line 18 | Insert comma "," between "X2" and "Y2" |
| Claim 10, | Line 24 | Insert comma "," between "X1" and "Y1" |

Signed and Sealed this

Eleventh Day of January, 1994

Attest:

BRUCE LEHMAN

*Attesting Officer*    *Commissioner of Patents and Trademarks*